July 13, 1971 L. J. BEINDORF 3,592,713
V-BELTING AND METHOD OF MANUFACTURE
Filed Dec. 26, 1967 2 Sheets-Sheet 1

INVENTOR
LUCIAN J. BEINDORF

BY Reuben Wolk
ATTORNEY

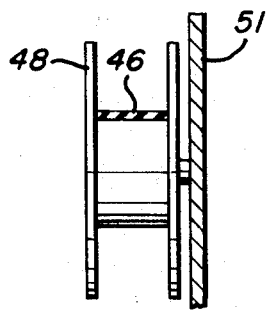 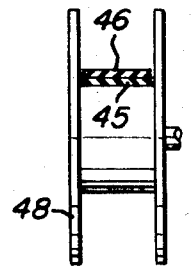 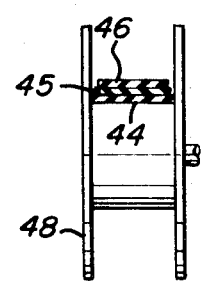 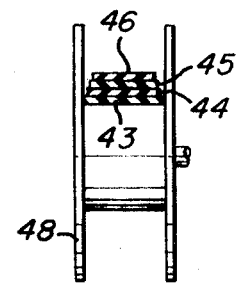
FIG-3  FIG-4  FIG-5  FIG-6
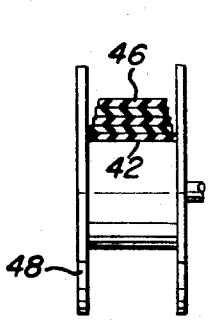 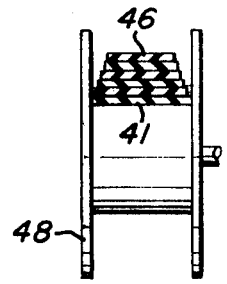 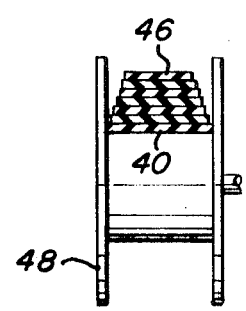 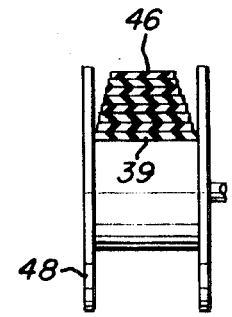
FIG-7  FIG-8  FIG-9  FIG-10
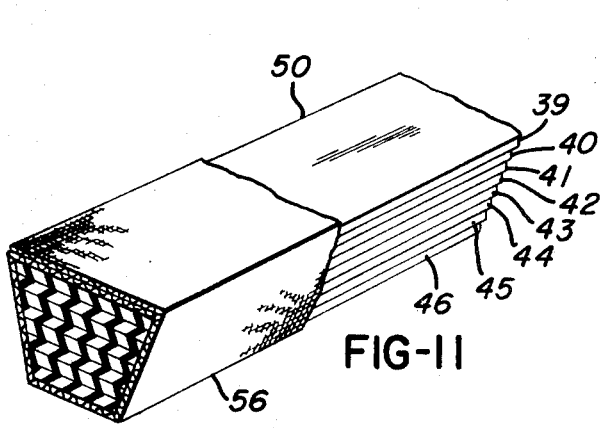 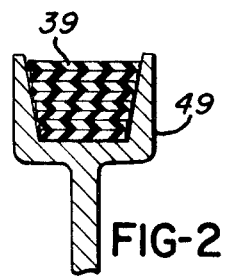
FIG-11  FIG-2
INVENTOR
LUCIAN J. BEINDORF
BY Reuben Wolk
ATTORNEY

United States Patent Office

3,592,713
Patented July 13, 1971

---

3,592,713
V-BELTING AND METHOD OF MANUFACTURE
Lucian J. Beindorf, Springfield, Mo., assignor to
Dayco Corporation, Dayton, Ohio
Filed Dec. 26, 1967, Ser. No. 693,377
Int. Cl. B32b 31/18; B29h 3/06
U.S. Cl. 156—259                                    4 Claims

ABSTRACT OF THE DISCLOSURE

V-belting of the non-endless type and method of manufacture in which the belting is formed by continuously assembling strips of rubber-impregnated fabric of different widths and compacting into a finished product.

---

This invention relates to V-belting and a method of manufacturing such belting. More specifically, the belting referred to herein is the type which is used in power transmission, particularly for driving power units of railway cars. Such belting is conventionally made in long lengths and stocked in rolls so that it may be cut into specific lengths, placed in position in the railway car, and the ends connected by means of a specially designed connector to make a continuous belt member. This is in contrast to the type of V-belt which is made in endless fashion and placed around the drive without the need of a connector.

The conventional method of manufacturing such belting is taught in U.S. Pats. No. 2,275,233 and No. 2,796,911, in which layers of fabric and rubber are built up on a mandrel to form an annular belt body, and this belt body is subsequently cut in helical fashion to form one continuous strip of belting material. There are a number of disadvantages in this conventional method because the spiral or helical cut provides a product which is not fully uniform, it creates a certain amount of scrap, and is a slow method of manufacture because it is essentially a batch rather than a continuous process. Despite these disadvantages this is the only method that has been used in production for many years simply because no better method has ever been found.

Applicant, however, has conceived a vastly improved method of manufacturing this type of belting and the resultant product is also far superior. In essence, the process consists of manufacturing a series of strips of rubber-impregnated fabric of different widths which are fed from let-off devices into a common take-up, these strips being superimposed in such a manner that they create the desired trapezoidal cross section. The superimposed layers are compacted to form the body of the belting, this completed body being subsequently fed into a covering or wrapping machine to provide the finished product. This product has been found on actual tests to have a life expectancy of at least double that of the conventional belt, and in addition, it can be made almost continuously by simply replacing the strips as they are used up. For example, even running the apparatus at a comparatively slow speed of 17 feet per minute, it is possible to manufacture 170,000 linear feet of belting in one week, using only a single operator. Because of this ease of operation and the reduction in labor, it is possible to effect substantial savings in the operation at the same time the product is improved.

These and other advantages of the invention will be readily apparent in the following description and drawings, in which:

FIG. 2 is a sectional view of the finished belting body.

FIGS. 3–10 are views similar to FIG. 2 illustrating the step-by-step construction of the product.

FIG. 11 is a perspective view of a portion of the finished belting body after wrapping with a cover.

Figure 1:
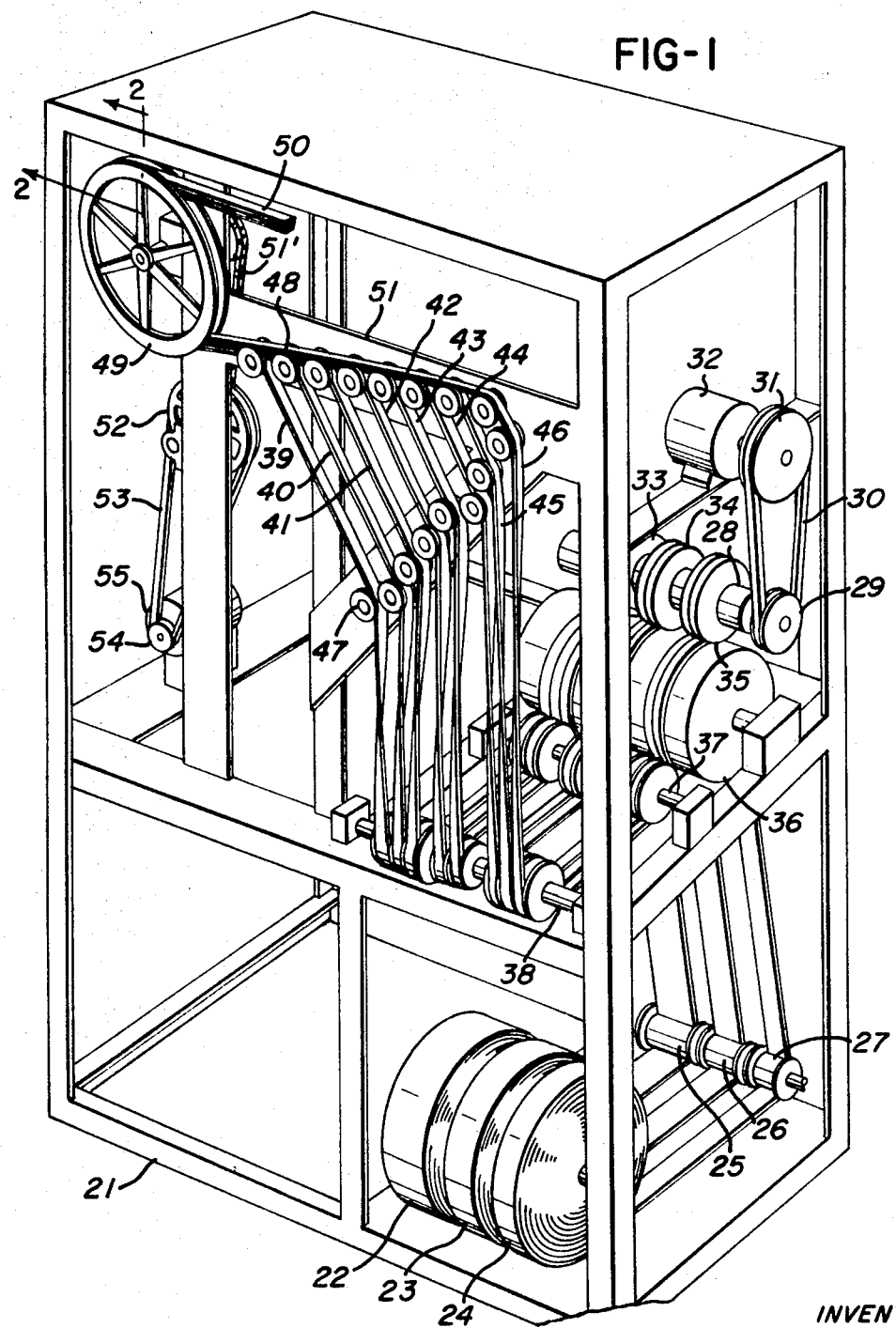
FIG. 1 is a perspective view of an apparatus for building the novel product.

Referring now to the drawings, FIG. 1 illustrates a novel apparatus in which a framework 21 carries all the raw materials necessary for the fabrication. In one portion of the frame are three spools having bands or wide strips of rubber-impregnated fabric 22, 23 and 24, all of which serve as let-offs for the fabric. The fabric on these spools may be of different thicknesses, ranging between 0.15 to .062 inch in accordance with the specific type of belting desired. The bands pass over guide spools 25, 26 and 27 up to and over a drum 36 where they are slit into strips of desired width. The slitting is accomplished in conjunction with a drum 28 which is rotated by a pulley 29 operated from a belt 30 and a pulley 31 which is driven by motor 32. A series of slitting discs 33, 34 and 35 are mounted in the shaft 28 and serve to slit the bands 22, 23 and 24 into strips as they pass over the drum 36. These strips then pass over guide rollers mounted on shafts 37 and 38 and pass upward as shown in the drawings. The strips are designated by reference numerals 39–46, inclusive, and are of diminishing width so that the strip 46 is the narrowest and the strip 39 is the widest. These strips pass over a first series of guide rollers 47 and then over a series of spools 48; the spools 48 are mounted on the member 51 and are aligned but slightly offset in a vertical direction. The narrowest strip 46 is first fed over the first spool 48 which is approximately as wide as the strip itself. The next strip 45 is also passed over one of the guide rolls 47 and under the first strip 46. Thus, the strip 45, which is wider, passes directly over the next spool 48 which is also slightly wider, and the strip 46 passes on top of the strip 45. The third strip 44, which is still wider, then passes over the third spool 48 and the strips 45 and 46 pass over the strip 44. The same step is repeated successively for strips 43, 42, 41, 40 and 39, and in each instance these strips being wider and passing directly over the next spool 48 in sequence, while the narrower strips pass directly over the wider strip. These steps are illustrated in FIGS. 3–10, with the final position shown in FIG. 10 in which all the strips are superimposed so that the widest is at the inner surface of the spool and the narrowest is at the outer surface thereof. The strips tend to retain their position without shifting because of the rubber impregnation of the fabric. The completed assembly is then passed around take-up roller 49, the finished belting body being designated by reference numeral 50. The relationship is illustrated in FIG. 2. The take-up roller 49 is driven by means of a belt 51 which in turn is driven from a shaft (not shown) which is rotated by pulley 52 that has its power transmitted through belt 53 from pulley 54 driven by motor 55. After the completed belting body is passed over the roller 49 it is then sent on to the next step in the process which consists of a conventional belt wrapping process in which the cover 56 is applied, as shown in FIG. 11. This body is then cured to form a finished product, the curing process not being illustrated herewith since it does not consitute part of the present invention.

It is thus seen that by a very simple process a continuous belting body is manufactured by successively passing strips of rubber impregnated fabric in such a manner that the strips become superimposed and form the tapered sides required for a trapezoidal belt. It is, of course, understood that the exact width and thickness of the strips, the number of strips involved, and the specific type of fabric used are all dependent upon the requirements of the belting. As noted above, the strips may be anywhere from .015 to .062 inch thick and as a practical matter anywhere from four to sixteen of these strips may be utilized to manufacture the belt, although the exact number of strips is not limited.

Other modifications in the basic invention described and illustrated may be made without departing from the spirit of the invention.

What is claimed is:

1. A method of manufacturing V-belting comprising the steps of continuously forming strips of dissimilar widths, and laminating said strips together to form a nonendless body in which said strips are formed of rubber impregnated fabric of dissimilar thicknesses.

2. The method of claim 5 including the step of wrapping said body with a cover.

3. A method of manufacturing V-belting comprising the steps of continuously feeding a plurality of bands of rubber impregnated fabric of dissimilar thicknesses, slitting said bands into continous strips of dissimilar widths, feeding a first strip, feeding a second strip adjacent said first strip to laminate said strips together, and successively feeding said other strips to laminate each strip to the previously fed strips until all strips are laminated into a continuously formed body.

4. The method of claim 3 in which said first strip is the narrowest of all strips and each successive strip is wider than the preceding ones.

References Cited

UNITED STATES PATENTS

| | | | |
|---|---|---|---|
| 2,588,647 | 3/1952 | Mitchell | 156—139 |
| 2,822,856 | 2/1958 | Waugh | 156—139 |
| 1,452,379 | 4/1923 | Haren | 156—260X |
| 1,538,303 | 5/1925 | Short | 74—233 |
| 1,778,307 | 10/1930 | Bowers et al. | 156—260X |
| 1,852,451 | 4/1932 | Everett | 156—260 |
| 1,869,011 | 7/1932 | Kuhlke | 156—260X |
| 2,355,113 | 8/1944 | Schieren | 74—233 |
| 2,761,803 | 9/1956 | Breitenbach | 156—260 |

BENJAMIN A. BORCHELT, Primary Examiner

D. A. BENT, Assistant Examiner

U.S. Cl. X.R.

156—139

PO-1050
(5/69)

UNITED STATES PATENT OFFICE
CERTIFICATE OF CORRECTION

Patent No. 3,592,713              Dated   July 13, 1971

Inventor(s)  Lucian J. Beindorf

It is certified that error appears in the above-identified patent and that said Letters Patent are hereby corrected as shown below:

Column 2, line 10, change "0.15" to --- .015 ---

Signed and sealed this 28th day of March 1972.

(SEAL)
Attest:

EDWARD M. FLETCHER, JR.                 ROBERT GOTTSCHALK
Attesting Officer                       Commissioner of Patents